US007862081B2

(12) United States Patent
Thomas

(10) Patent No.: US 7,862,081 B2
(45) Date of Patent: Jan. 4, 2011

(54) MOTOR VEHICLE SAFETY RESTRAINT SYSTEM

(75) Inventor: Scott D. Thomas, Novi, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 110 days.

(21) Appl. No.: 12/248,093

(22) Filed: Oct. 9, 2008

(65) Prior Publication Data
US 2010/0090449 A1 Apr. 15, 2010

(51) Int. Cl.
B60R 21/18 (2006.01)
B60R 22/46 (2006.01)

(52) U.S. Cl. ............... 280/733; 280/730.2; 280/736; 280/801.1; 280/807

(58) Field of Classification Search ............ 280/730.2, 280/733, 736, 801.1, 807; B60R 21/18
See application file for complete search history.

(56) References Cited

U.S. PATENT DOCUMENTS

| 3,957,283 | A | * | 5/1976 | Pocobello | 297/475 |
|---|---|---|---|---|---|
| 5,411,291 | A | | 5/1995 | Fohl | |
| 5,450,723 | A | | 9/1995 | Fohl | |
| 5,588,677 | A | | 12/1996 | Kopetzky et al. | |
| 5,704,638 | A | * | 1/1998 | Lane, Jr. | 280/730.2 |
| 5,984,357 | A | | 11/1999 | Yasuda et al. | |
| 6,010,151 | A | * | 1/2000 | Honda | 280/733 |
| 6,131,951 | A | | 10/2000 | Chicken et al. | |
| 6,382,666 | B1 | * | 5/2002 | Devonport | 280/733 |
| 6,406,058 | B1 | * | 6/2002 | Devonport et al. | 280/733 |
| 6,425,602 | B1 | * | 7/2002 | Al-Amin et al. | 280/730.2 |
| 6,863,298 | B2 | | 3/2005 | Sakai et al. | |
| 6,874,817 | B2 | | 4/2005 | Nakano et al. | |
| 6,877,776 | B2 | | 4/2005 | Ukita et al. | |
| 7,168,742 | B2 | | 1/2007 | Tomita | |
| 7,172,218 | B2 | | 2/2007 | Nakano et al. | |
| 7,237,800 | B2 | | 7/2007 | Itoga | |
| 7,607,687 | B2 | * | 10/2009 | Clute et al. | 280/733 |
| 2001/0011810 | A1 | * | 8/2001 | Saiguchi et al. | 280/728.1 |
| 2003/0230872 | A1 | * | 12/2003 | Sakai et al. | 280/728.1 |
| 2005/0057022 | A1 | * | 3/2005 | Birk et al. | 280/728.3 |

(Continued)

FOREIGN PATENT DOCUMENTS

EP 1253357 B1 12/2005

(Continued)

Primary Examiner—Paul N. Dickson
Assistant Examiner—Barry Gooden, Jr.
(74) Attorney, Agent, or Firm—Quinn Law Group, PLLC

(57) ABSTRACT

A safety restraint system for selectively restraining an occupant of a motorized vehicle is provided. The safety restraint system includes a cylinder defining an elongate channel therein. A piston is disposed inside the channel, and selectively translates from an undeployed position to a deployed position. A linking member operatively connects the safety belt webbing to the piston such that translation of the piston increases the tension of the belt webbing. The safety restraint system also includes an inflatable cushion operatively attached to the cylinder, and configured to selectively transition from a non-expanded state to an expanded state. An inflation device operable to release inflation fluid is in fluid communication with both the inflatable cushion and the cylinder. Activation of the inflation device operates to transition the cushion from the non-expanded state to the expanded state, and translate the piston from the undeployed position to the deployed position.

19 Claims, 5 Drawing Sheets

U.S. PATENT DOCUMENTS

| | | | |
|---|---|---|---|
| 2005/0189752 A1* | 9/2005 | Itoga et al. | 280/741 |
| 2006/0208124 A1* | 9/2006 | Clute | 242/374 |
| 2007/0102910 A1* | 5/2007 | Nezaki et al. | 280/733 |
| 2008/0018085 A1* | 1/2008 | Clute | 280/733 |
| 2009/0066063 A1* | 3/2009 | Mical | 280/733 |
| 2009/0108570 A1* | 4/2009 | Itoga | 280/730.2 |
| 2009/0160167 A1* | 6/2009 | Itoga | 280/733 |
| 2009/0160168 A1* | 6/2009 | Itoga | 280/733 |
| 2009/0184503 A1* | 7/2009 | Itoga | 280/733 |
| 2009/0230662 A9* | 9/2009 | Itoga | 280/733 |
| 2009/0243262 A1* | 10/2009 | Itoga | 280/728.2 |
| 2009/0267332 A1* | 10/2009 | Clute | 280/733 |
| 2009/0273168 A1* | 11/2009 | McCormick | 280/736 |
| 2009/0322067 A1* | 12/2009 | Nezaki | 280/807 |

FOREIGN PATENT DOCUMENTS

| | | |
|---|---|---|
| EP | 1431134 B1 | 4/2006 |
| EP | 1513708 B1 | 12/2007 |
| GB | 2244203 A | 11/1991 |
| GB | 2375329 A | 11/2002 |

* cited by examiner

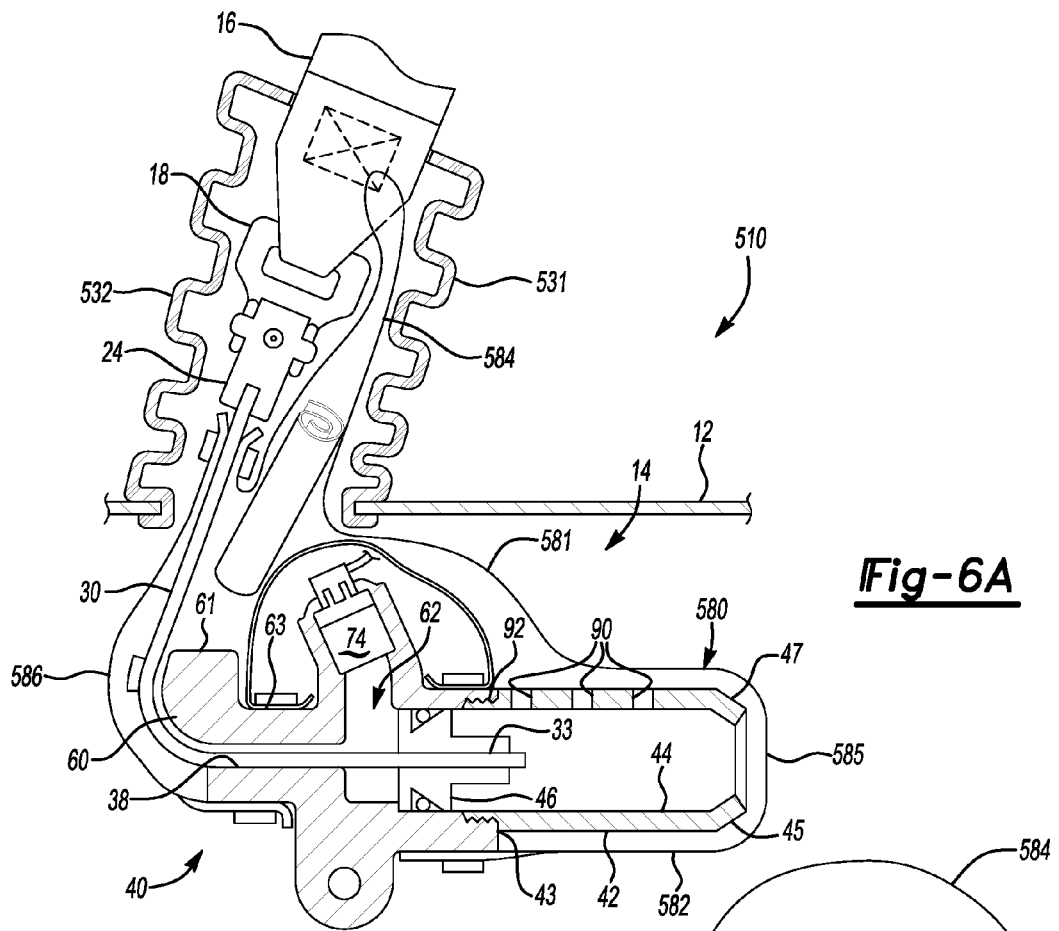

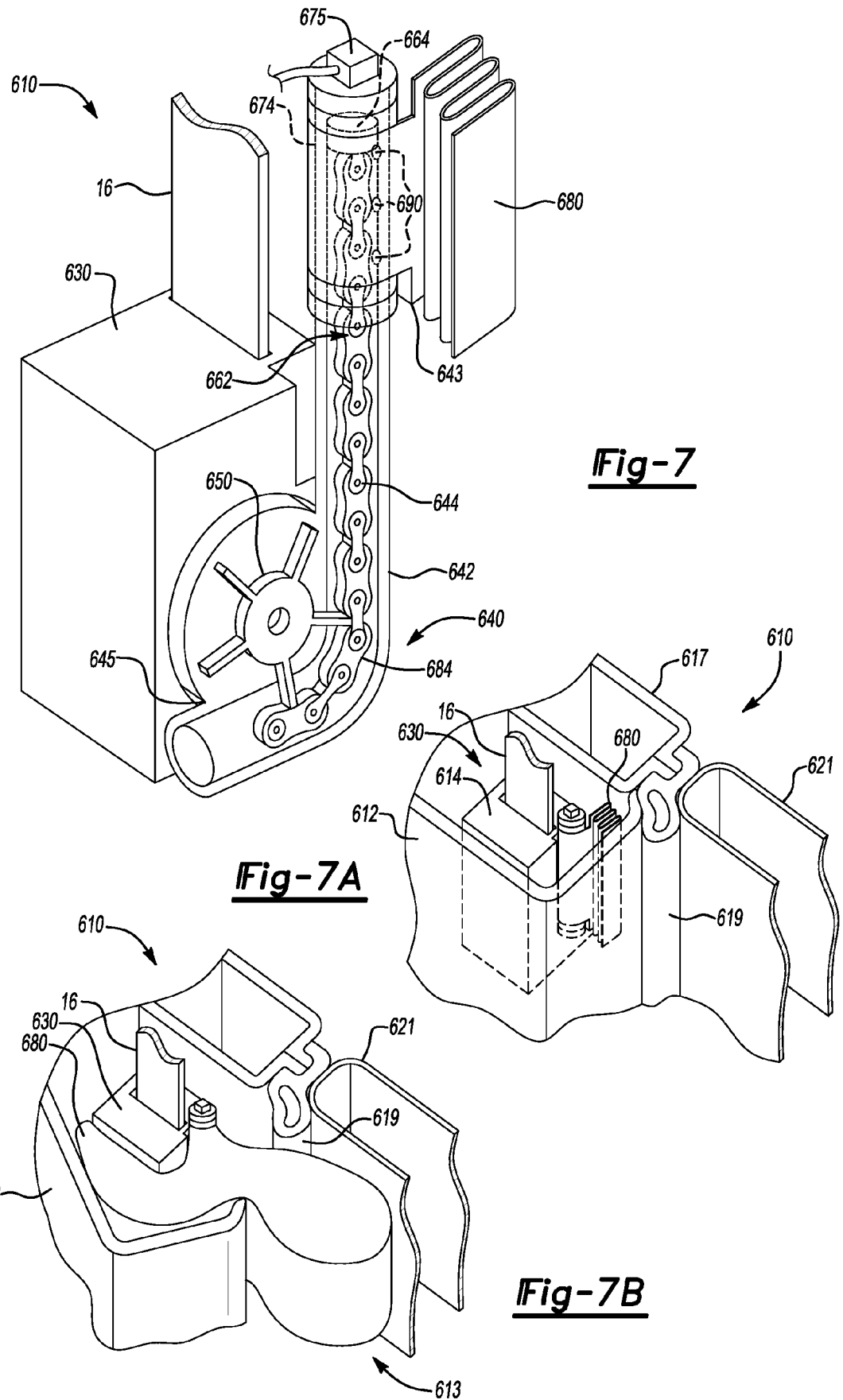

MOTOR VEHICLE SAFETY RESTRAINT SYSTEM

TECHNICAL FIELD

The present invention relates generally to safety restraint systems for occupants of motorized vehicles, and more particularly to supplemental inflatable restraint systems and seatbelt pretensioner devices.

BACKGROUND OF THE INVENTION

A seatbelt assembly is a type of harness system designed to restrain an occupant of an automobile or other motorized vehicle against inadvertent movement that may result, for example, from an abrupt stop or sudden impact with a foreign obstruction. Conventional seatbelt assemblies (also referred to as "safety belts") employ a belt buckle or like element, which is located inboard from the occupant seating position, for engagement with a mating latch plate or fastener, generally provided outboard from the occupant seating position. Engagement of the latch plate with the belt buckle positions a belt strap or webbing across the body of a seated occupant for restraining the occupant against abrupt movement from the seat.

Due to the nature and magnitude of the loads on the safety belt during vehicle impact, the seatbelt assembly has traditionally been mounted directly to the vehicle structure, generally utilizing a three-point attachment configuration. In such arrangements, the belt webbing is normally attached at one end to the vehicle side structure by a belt retractor that is rigidly mounted thereto. The webbing extends upwardly along the vehicle side-structure, passing through a support member, such as a D-ring, mounted near the top of the B-pillar. The strap then extends downward, and is anchored at a second end to the floor pan or side structure adjacent to the retractor.

The latch plate is supported on the belt webbing, adapted to slide between the support-ring and the end of the strap anchored to the vehicle structure. The belt buckle, on the other hand, is conventionally mounted to the vehicle structure, such as to the floor pan or tunnel, by a buckle strap which extends through a gap between the bottom cushion and either the middle console or the back cushion of the seat. In a two-point attachment configuration (e.g., wherein a lap belt is provided), the second end of the belt webbing is adjustably secured directly to the latch plate, thereby eliminating the third attachment point.

It is also reasonable to mount portions of the seatbelt assembly directly to the vehicle seat assembly so that the seatbelt anchors maintain a more consistent relationship to the occupant when the seat position is adjusted. By way of example, the seatbelt retractor may be affixed directly to the seat platform (i.e., the base of the seat frame). The strap then extends upwards along the back-frame of the upper seat cushion and passes through a guide or upper support member mounted at the top of the seat frame, adjacent the head rest. The strap then extends downward, and is anchored to the seat frame adjacent to the retractor. With today's seatbelt systems, it is more common to mount the inboard anchor to which the buckle attaches to the seat structure. Many seatbelt implementations also mount the outboard lower anchor to the seat structure. For these implementations, the anchor is typically attached to the portion of the seat structure that moves fore-aft when the seating position is adjusted, but not to the portion of the seat frame that moves up-down when the seating position is adjusted.

The seatbelt retractor is intended to increase comfort for the vehicle occupant by allowing the webbing to pay out under relatively low loads, enabling limited movement of the restrained occupant. The retractor is biased to keep the webbing relatively taut about the vehicle occupant, and includes a locking device to lock the retractor against webbing pay out at low loads under certain extraordinary conditions. In addition, energy absorbing webbing payout features have been introduced to control the amount of loading that a seatbelt can provide during occupant restraint in an impact, and act to pay out the webbing at predetermined force levels.

In recent years, "pretensioners" have been introduced to actively tighten the seatbelt strap about the vehicle occupant in the event of a sensed triggering condition, such as the onset of a crash. A pretensioner operates to rapidly draw in a length of webbing, which takes up any slack that may have developed in the belt, in order to maximize the effect of the seatbelt protection and help to more correctly position the vehicle occupant in the seat.

Many vehicles, as part of an overall occupant restraint system, may also include one or more inflatable airbag devices. Inflatable airbag devices, which are now more commonly referred to in the art as Supplementary Restraint Systems (SRS), Air Cushion Restraint Systems (ACRS), or Supplemental Inflatable Restraint Systems (SIR), are originally equipped in almost all present day automotive vehicles. Airbag devices are generally located in the passenger compartment of automotive vehicles, and act as a selectively deployable cushion capable of attenuating occupant kinetic energy. Most airbags are also designed to minimize inadvertent movement of the occupant to eliminate involuntary contact with the interior structure of the automobile.

Traditional airbag devices comprise an inflatable airbag module stored behind the vehicle instrument panel (e.g., for passenger-side airbags), mounted to the steering wheel hub (e.g., for driver-side airbags), or housed within a vehicle seat assembly, side door trim, or headliner trim (e.g., for side-impact airbags). A plurality of sensors or similar devices is strategically located throughout the automobile to detect the onset of a predetermined triggering event. The sensor(s) responsively activates an inflation device, internally located in the airbag module, to produce a flow of inflating gas into an inflatable flexible cushion (i.e., an airbag cushion), also located within the airbag module. The inflating gas causes the airbag cushion to be deployed into the vehicle passenger compartment, toward the vehicle occupant.

SUMMARY OF THE INVENTION

According to one embodiment of the present invention, a safety restraint system for a motorized vehicle is provided. The vehicle has a passenger compartment with a safety belt assembly mounted therein. The safety restraint system includes a tubular member defining an elongate channel therein. A piston member is operatively disposed inside the channel to selectively translate from an undeployed position to a deployed position. A linking member operatively connects the belt webbing to the piston member such that translation of the piston member increases the tension of the belt webbing and reduces its effective length. The safety restraint system also includes a cushion member that is operable to selectively transition from a non-expanded state to an expanded state. An inflation device, operable to discharge inflation fluid, is in fluid communication with both the inflatable cushion and the tubular member. Activation of the inflation device operates to transition the cushion member from the non-expanded state to the expanded state, and also to translate the piston member from the undeployed position to the deployed position.

According to one aspect of this particular embodiment, at least a portion of the cushion member is wrapped around the tubular member. To this regard, the cushion member can also be configured to envelop substantially all of the tubular member.

According to another aspect of this embodiment, the tubular member includes one or more vent holes. Each vent hole fluidly communicates the tubular member with the cushion member. Moreover, the safety restraint system can be designed such that the sole means of fluid communication between the cushion member and the inflation device consists of the vent hole(s) in the tubular member. In a similar regard, the vent holes can be designed and oriented to selectively fluidly communicate the inflation device with the cushion member only after the piston member has translated a predetermined distance away from the undeployed position. Alternatively, the vent holes can be designed to communicate with the cushion before the piston has translated any distance, and can configured to create a larger communication path as the piston translates further away from the undeployed position.

In accordance with another aspect, the linking member is a cable that is rigidly attached at one end to the belt webbing, and attached at an opposing end thereof to the piston member. In this instance, the safety restraint system preferably also includes a bracket member that is attached to the tubular member, proximate to the first end of the channel. The bracket member is adapted to guide the cable while the piston member translates from the undeployed position to the deployed position. Optionally, the cushion member is also wrapped around at least a portion of the bracket member. To this regard, the cushion member may be further wrapped around at least a portion of the upper extent of the cable.

As part of another aspect, the bracket member includes one or more gas escape paths that fluidly communicate the inflation device with the cushion member. It may be desirable to design and orient the gas escape path(s) to direct fluid from the inflation device to the cushion member before the piston member is moved from the undeployed position to the deployed position (e.g., enable gas transfer to the cushion member prior to movement of the piston member).

In accordance with yet another aspect of this embodiment, the safety restraint system also includes a closeout cover that houses or conceals both the tubular member and the cushion member.

In yet another aspect, the safety restraint system also includes a collapsible casing that is attached at a first end thereof to the closeout cover. The collapsible casing is configured to enclose a portion of the upper extent of the linking member therein. In this instance, a portion of the cushion member may be stowed inside the collapsible casing when the cushion member is in the non-expanded state. Preferably, the collapsible casing then includes a tear seam or a material overlap joint that is configured to open such that the cushion member can deploy through the collapsible casing when transitioning from the non-expanded state to the expanded state.

In accordance with even yet another aspect, the linking member includes a belt retractor member. The belt retractor member, tubular member, and cushion member may be housed inside a side-trim panel or seat trim panel. In this particular instance, the cushion member deploys through the side-trim panel when transitioning from the non-expanded state to the expanded state. It may also be desirable that a portion of the cushion member deploy on the inside of the side-trim panel when transitioning from the non-expanded state to the expanded state, thereby pushing a portion of the trim panel inboard toward an occupant.

According to another embodiment of the present invention, a safety restraint system is provided for selectively restraining an occupant of a motorized vehicle. The vehicle has a passenger compartment with a seat assembly mounted therein. A seatbelt assembly is operatively mounted to the vehicle, with a webbing portion thereof positioned outboard from the seat assembly relative to the vehicle.

The safety restraint system includes an inflator that is selectively operable to release inflation fluid. A cylinder with a channel elongated axially therein is in fluid communication with the inflator. The cylinder includes at least one vent hole. A piston is disposed inside the cylinder. The piston is operable to selectively axially translate between first and second opposing ends of the channel from an undeployed position to a deployed position. A linking member operatively connects the belt webbing to the piston such that translation of the piston retracts a predetermined length of the belt webbing to thereby increase tension of the belt webbing.

The safety restraint system also includes an inflatable cushion with at least a portion thereof wrapped around the cylinder such that the vent hole(s) in the cylinder fluidly communicates the inflatable cushion with the inflator. The inflatable cushion is operable to selectively transition from a non-expanded state, in which the cushion is generally stowed, to an expanded state, in which the cushion is deployed into the vehicle passenger compartment. Activation of the inflator operates to transition the inflatable cushion from the non-expanded state to the expanded state as well as translate the piston from the undeployed position to the deployed position.

The above features and advantages, and other features and advantages of the present invention will be readily apparent from the following detailed description of the preferred embodiments and best modes for carrying out the present invention when taken in connection with the accompanying drawings and appended claims.

BRIEF DESCRIPTION OF THE DRAWINGS

FIG. 6A is a side-view illustration in partial cross-section of a combined seatbelt pretensioner and airbag safety restraint system in accordance with another embodiment of the present invention, with the pretensioner piston shown in an undeployed position and the airbag cushion shown in a non-expanded state, respectively;

FIG. 6B shows the pretensioner piston and airbag cushion of FIG. 6A in a deployed position and expanded state, respectively;

FIG. 7 is a perspective-view illustration of a combined seatbelt pretensioner and airbag safety restraint system in accordance with yet another embodiment of the present invention;

FIG. 7A is an elevated perspective-view illustration of a portion of an exemplary motor vehicle with the safety restraint system of FIG. 7 operatively mounted therein; and FIG. 7B shows the airbag cushion from FIG. 7A in an expanded state.

DESCRIPTION OF THE PREFERRED EMBODIMENTS

Figure 1A:
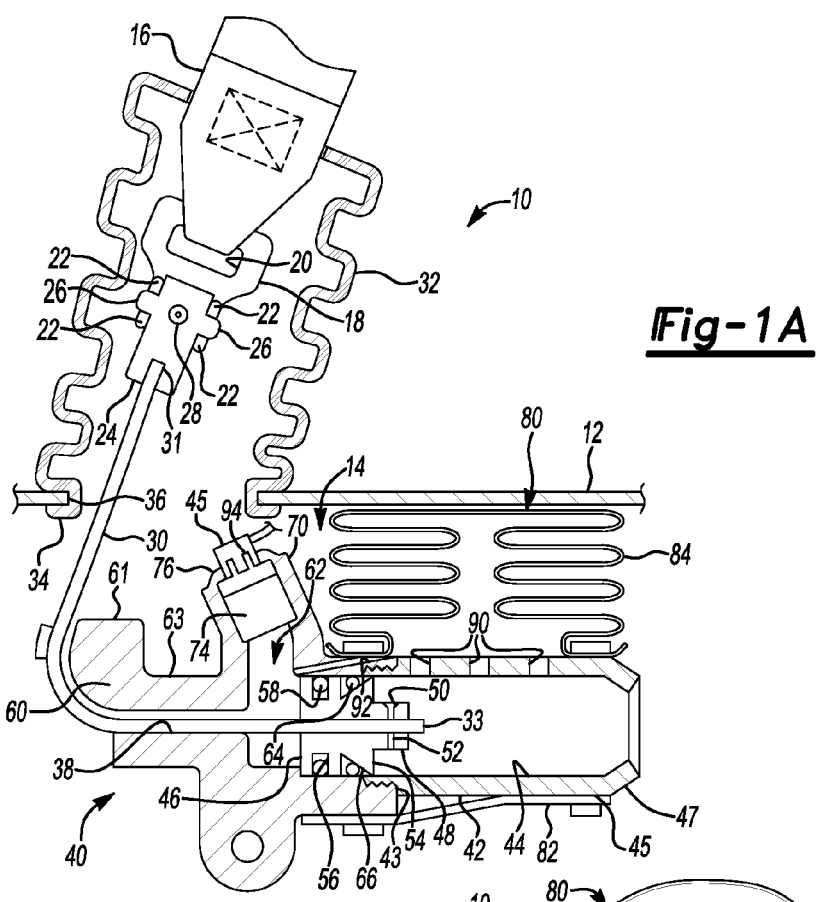
FIG. 1A is a side-view illustration in partial cross-section of a combined seatbelt pretensioner and airbag safety restraint system in accordance with a preferred embodiment of the present invention, showing the pretensioner piston in an undeployed position and the airbag cushion in a non-expanded state.

Referring to the drawings, wherein like reference numbers refer to like components throughout the several views, there is shown in FIG. 1A a motor vehicle safety restraint system, designated generally at 10, in accordance with one embodiment of the present invention. The drawings presented herein are not to scale—the dimensions and relative orientation of the constituent components shown throughout the drawings are intentionally exaggerated for clarity and a better understanding of the present invention. Thus, the individual and relative dimensions and orientations shown in the drawings are not to be considered limiting. In addition, the present invention will be described herein in the context of a standard passenger vehicle. However, the present invention may just as easily be incorporated into any motorized vehicle platform. Finally, it should be readily appreciated that the adjectives used to specify spatial relationships, such as inboard, outboard, rearward, horizontal, vertical, upper, lower, etc., indicate spatial relationships as they exist with respect to their intended orientations relative to an automobile when operatively oriented therein. Nevertheless, the spatial relationships specified may be varied within the scope of the claims appended hereto.

Figure 1B:
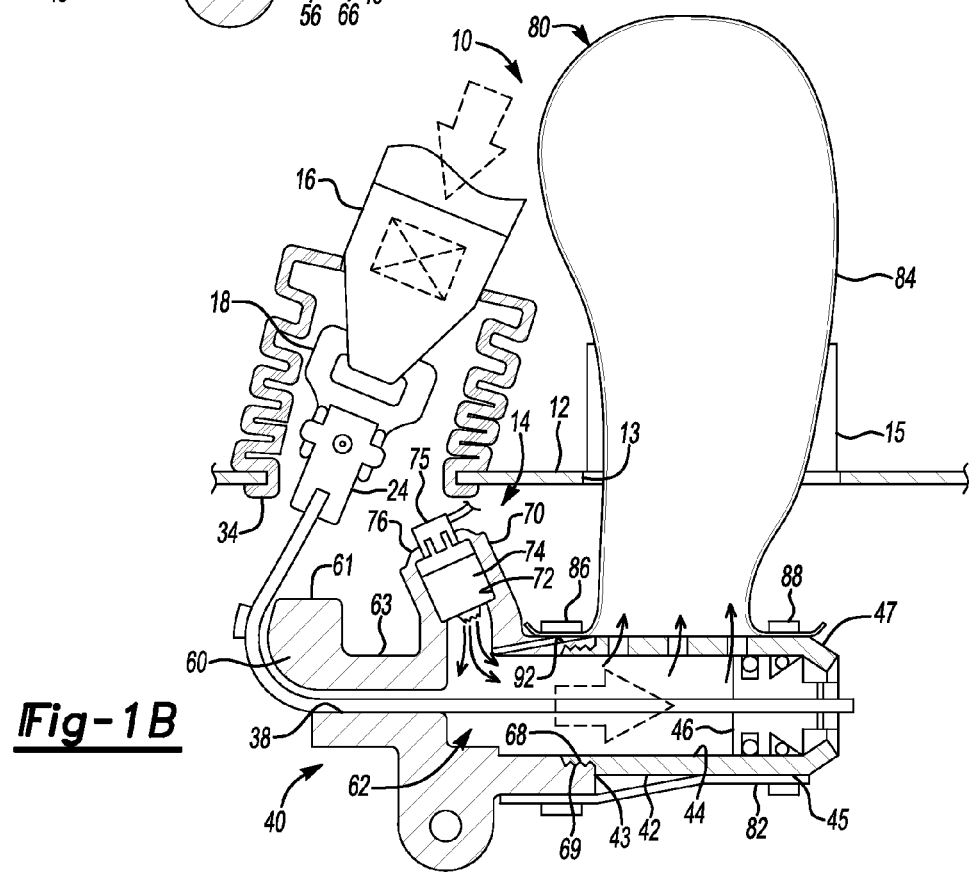
FIG. 1B shows the pretensioner piston and airbag cushion of FIG. 1A in a deployed position and expanded state, respectively.

The safety restraint system 10 is mounted inside of a conventional motorized vehicle, such as a modern-day automobile, which is represented in FIGS. 1A and 1B by a portion of an interior side-trim panel 12. The trim panel 12, acting as a "closeout cover", defines an internal hollow or compartment 14 that is sized and shaped to nest, stow, and conceal the safety restraint system 10 therein. The trim panel 12 and safety restraint system 10 are preferably located on the vehicle seat assembly (not explicitly illustrated, but certainly understood by those of ordinary skill in the art), but could also be located laterally outboard from a vehicle seat assembly, packaged adjacent to a B- or C-pillar inside of the vehicle passenger compartment. The trim panel 12 may also be designed to cover various additional underlying components when installed in the motorized vehicle, such as one or more HVAC ducts (not shown), seat recliner mechanisms (not shown), assorted electrical switches (not shown), assorted wiring harnesses (not shown), etc.

A safety belt assembly (also referred to herein as "seatbelt assembly"), represented in FIGS. 1A and 1B of the drawings by a length of retractable seatbelt webbing 16, is also mounted inside the passenger compartment, preferably in a conventional three-point attachment configuration. A latch plate (not shown) is preferably slidably supported by the belt webbing 16. In accordance with the present invention, one end of the belt webbing 16 is operatively attached to a pretensioner device, indicated generally by reference numeral 40. In the exemplary embodiment illustrated in FIGS. 1A and 1B, a proximal portion of the belt webbing 16 is looped through a web slot 20, which is formed through an upper anchor 18. The belt webbing 16 is secured to the upper anchor 18, for example, by folding the looped-through end back onto itself, and stitching the proximal end to an adjacent portion of the webbing 16.

The upper anchor 18 is attached to a lower anchor 24 through the interleafed engagement of complementary fingers 22 and 26 that respectively project outward from mating sections of the upper and lower anchors 18, 24. A fastener 28 is passed through the upper and lower anchors 18, 24 to confirm a proper interconnection between the two anchor members, and to retain anchor interface until a tensile load is applied. The lower anchor 24, in turn, is attached to a first end 31 of cable 30 (e.g., via clinching, crimping, or other mechanical attachment), which acts as a linking member as will be described in further detail hereinbelow. It should be recognized that the safety restraint system 10 may alternatively be packaged laterally inboard from the vehicle seat assembly, wherein the belt webbing 16 is a segment of a conventional buckle strap or as another option so that the cable 30 is attached directly to a buckle member (not shown) of the seatbelt assembly.

The upper extent of cable 30, the proximal end of the belt webbing 16, as well as the upper and lower anchors 18, 24 are enclosed within a collapsible casing 32 (also known in the art as "snorkel" or "bellow"), which is attached at a first end thereof to the trim panel 12. By way of example, and not limitation, the collapsible casing 32 includes a reduced section flange portion 34 that is received in, and snap-fit into engagement with a slot 36 formed through the trim panel 12. Evidently, other means of connecting the collapsible casing 32 to the trim panel 12 may be used without departing from the intended scope of the present invention.

With continuing reference to FIG. 1A, the pretensioner device 40 includes a tubular member 42 which, in preferred practice, is an elongated, metallic, cylindrical tube with first and second opposing ends 43 and 45, respectively. However, the cross-sectional geometry and material characteristics of the tubular member 42 may be varied without departing from the intended scope of the present invention. The tubular member 42 (also referred to herein as "cylinder") defines an elongate channel 44 therein that is coaxially oriented with and extends longitudinally along the cylinder 42. A piston 46 is slidably disposed inside the channel 44, operating, as described below, to transition from an undeployed position (shown in FIG. 1A) to a deployed position (shown in FIG. 1B).

The cable 30 is attached at a second end 33 thereof to the piston 46. For example, as seen in the exemplary embodiment of FIGS. 1A and 1B, a reduced diameter portion 48 of the piston 46 includes a countersunk hole 50 within which is passed a locking pin 52 for securing the cable 30 to the piston 46. Alternatively, the cable 30 and piston 46 can be integrally formed as a one-piece structure, or positively attached by other means (e.g., welding, clinching, threading, etc.) A guide channel 38 serves as an entrance for the cable 30 at the side opposite the cylinder 42. The guide channel 38 is formed to be coaxial with the cylinder 42, and so as to have a diameter which is slightly larger than the outer diameter of the cable 30, such that the cable 30 may slide therein. The guide channel 38 operates to direct the cable 30 while the piston 46 translates from the undeployed position (FIG. 1A) to the deployed position (FIG. 1B).

An increased diameter portion 54 of the piston 46, which is adjacent to and integral with the reduced thickness portion 48, includes an annular groove 56 that extends circumferentially about the outer-diameter surface thereof. The annular groove 56 is configured to receive and retain a sealing member, such as an elastomeric o-ring 58, for fluidly sealing a gas chamber 62, collectively formed or defined by a portion of the cylinder 42, the back of piston 46, and a portion of bracket 60. In addition, an array of balls 64 are trapped between the inner peripheral surface of the cylinder 42 and a tapered segment 66 of the increased diameter portion 54. The diameters of the balls 64 are smaller than the maximum clearance between the tapered segment 66 and the inner peripheral surface of the cylinder 42. The balls 64 will wedge themselves between the inner peripheral surface of the cylinder 42 and the outer peripheral surface of the tapered segment 66 if the piston 46 attempts to translate in the opposite direction of deployment (e.g., leftward with respect to FIG. 1A), thereby impeding such movement. Note that within the scope of this invention, other means can be found in commercially available pretensioners for preventing piston travel in the direction opposite of deployment.

With reference to FIG. 1B, the bracket member 60 includes a threaded mounting hole 68 which receives and threadably engages with a complementary threaded outer surface 69 oriented along the first end 43 of the cylinder 42. An integrally formed boss portion 70 projects obliquely from an upper side of the bracket 60, formed above the gas chamber 62. A mounting chamber 72, which communicates with the gas chamber 62, is provided at the interior of the boss portion 70. An inflation fluid dispensing apparatus 74 (or "inflator" for short) is housed inside of the mounting chamber 72, and secured therein by a cap 76. The cap 76 can be integral to the bracket member 60 or a separate piece. Alternatively, the inflator 74 can be mounted parallel to the cylinder 42, and placed in fluid communication with the gas chamber 62 via one or more fill tubes (not explicitly illustrated).

The safety restraint system also includes an inflatable cushion or flexible membrane 80. In the embodiment of FIGS. 1A and 1B, the cushion 80 is divided into two primary portions: a sleeve portion 82 and an expansion portion 84. The sleeve portion 82 is engineered like a sheath. Specifically, the sleeve portion 82 is open at opposing ends thereof. One open end of the sleeve portion 82 is passed over the second end 45 of the cylinder 42, and pushed down the shaft of the cylinder 42. The cushion 80 is passed over the first end 43 of the cylinder 80 and onto the bracket member 60, wrapping the sleeve portion 82 of the cushion 80 around cylinder 42. First and second band clamps 86 and 88, respectively, securely attach the inflatable cushion 80 to the cylinder 42, and also function to fluidly seal the sleeve portion 82 about the outer perimeter of the cylinder 42 at the first and second ends 43, 45 thereof.

The cylinder 42 includes a plurality of vent holes 90, which are preferably circular in shape. Each vent hole 90 fluidly communicates the inner channel 44 of cylinder 42 with the expansion portion 84 of the cushion 80, as will be explained in extensive detail below. In addition, the bracket 60 includes a gas escape path 92 (FIG. 1B) that extends from the gas chamber 62 to the cushion 80, thereby providing an additional fluid path between the inflator 74 and the expansion portion 84 of the cushion 80. The number, size, geometry and orientation of the vent holes 90 and gas escape path 92 may be individually or collectively tailored to the particular application for which the safety restraint system 10 is to be applied. For instance, the gas escape path 92 could be located on the cylinder 42 if the piston's starting location was further down the cylinder 42 away from the inflation device 74. Moreover, the safety restraint system 10 can be designed such that the sole means of fluid communication between the cushion member 80 and the inflation device 74 consists of the vent hole(s) 90 in the tubular member 42.

The inflator 74 acts as a pyrotechnic device/pressure vessel, used to generate or store and discharge inflation gas. That is, the inflator 74 is selectively actuable to dispense a fluid, preferably in the nature of a pressurized gas such as nitrogen, argon, or carbon dioxide. In doing so, the inflator 74 is operable to selectively simultaneously deploy the piston 46 from the undeployed position (shown in FIG. 1A) to the deployed position (shown in FIG. 1B), and to transition the inflatable cushion 80 from a non-expanded state (as seen in FIG. 1A) to an expanded state (as seen in FIG. 1B).

In accordance with the exemplary embodiment of FIGS. 1A and 1B, the inflatable cushion 80 is shown in a non-expanded, stowable state in FIG. 1A, wherein the inflatable cushion 80 is inside the internal compartment 14 in a deflated and folded condition. In addition, the piston 46 is shown in FIG. 1A in an undeployed position, situated immediately adjacent to the gas chamber 62, at the first end 43 of the cylinder 42. Upon activation of the inflator 74 (e.g., via a triggering signal sent to electrical terminal 94), inflation gas is discharged into the gas chamber 62. As pressure increases in the gas chamber 62, the piston 46 is urged or forced to the deployed position (e.g., in a rightward direction relative to FIG. 1B), until the piston 46 bottoms out against a narrowed portion 47 at the second end 45 of the cylinder 42. Translation of the piston 46 as described above will draw or pull a portion of the cable 30 into the cylinder 42 and, in so doing, retract a predetermined length of the belt webbing 16, which increases the tension of the belt webbing 16.

Contemporaneous with the deployment of piston 46, inflation gas is forced into the expansion portion 84 of the cushion 80 through the gas escape path 92 prior to and during movement of the piston 46, and through the vent holes 90 after the piston 46 has moved past them, thereby inflating the cushion 80. As the cushion 80 inflates, it pushes against some form of deployment door, such as discrete door 15, creating an opening 13 in the trim panel 12. The discrete door 15 can be part of the trim panel 12 or a separate part mating with the trim panel. The cushion 80 transitions through the opening 13 to a second, expanded state (FIG. 1B), in which the cushion 80 is substantially outside the cavity 14, positioned between a vehicle occupant and a portion of the vehicle interior structure.

Although the trim panel 12 is shown in FIG. 1B with a discrete door 15 for operatively concealing and releasing the air bag cushion 80, the trim panel 12 can be designed with a tear seam (not shown) or in a "burping" configuration with respect to an adjacent component to allow for deployment of the cushion 80. In addition, the trim panel 12 may optionally have sidewalls or a separate chute member (not shown) that at least partially surrounds the undeployed cushion and helps guide it to the deployment door so that it does not deploy in another direction under the trim panel 12. The sidewalls or separate chute member may be extendable (not shown) such as via bellows or via overlapping sliding members in order to accommodate trim designs where the seat can be vertically moved with respect to the undeployed cushion 80. They could also be formed as a pocket such as optionally with fabric from the seat cover.

The vent holes 90 can be arranged at preselected locations along the cylinder 42 such that the inflator 74 cannot distribute inflation fluid to the expansion portion 84 of the cushion 80 until after the piston 46 has translated a predetermined distance away from the undeployed position (FIG. 1A). For example, the cylinder 42 may be fabricated with an array of vent holes 90 that are circumferentially spaced about the second end 45 thereof such that fluid communication between the chamber 44 and expansion portion 84 is restricted until the piston 46 transitions to the deployed position (FIG. 1B), thereby delaying full expansion of the cushion 80. Alternatively, it may be desirable to design and orient the gas escape path(s) 92 to enable gas transfer from the inflation device 74 to the cushion 80 prior to any piston movement. This may be achieved, for example, by eliminating all vent holes 90 that are proximate to the first end 43 of the cylinder 42, and increase the cross-sectional area of the escape path 92.

Figure 2:
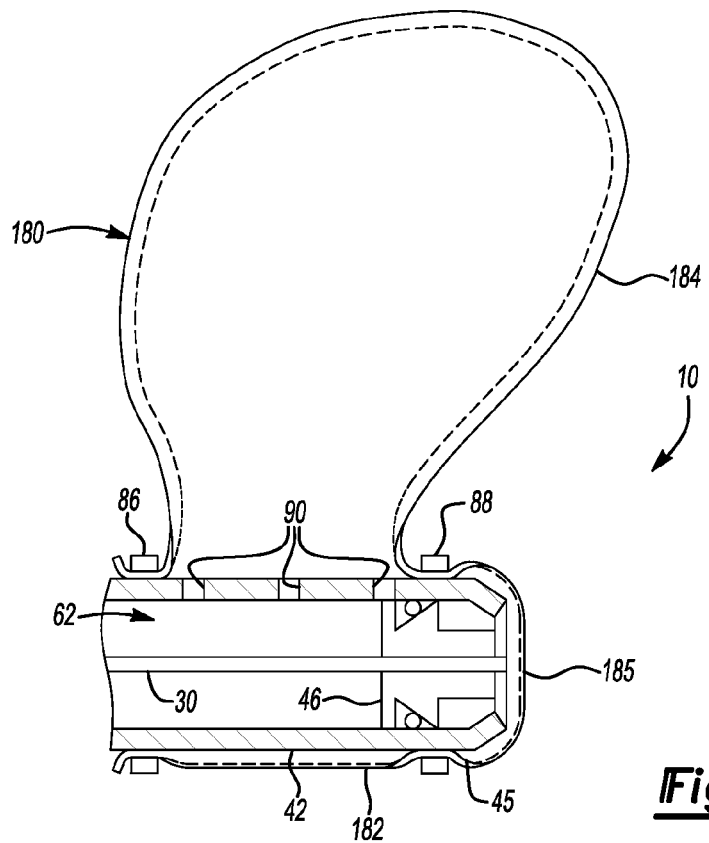
FIG. 2 is a side-view illustration of an inflatable airbag cushion configuration in accordance with one embodiment of the present invention.

FIGS. 2-5 illustrate various inflatable airbag cushion configurations in accordance with the present invention. As noted hereinabove, like reference numerals are used in FIGS. 2-5 to indicate similar structure from FIGS. 1A-1B. Looking first at FIG. 2, an inflatable cushion 180 is shown similarly situated and operable as described above with respect to the cushion 80 of FIGS. 1A and 1B. The cushion 180 of FIG. 2 is also divided into two primary portions: a sleeve portion 182 and an expansion portion 184. In this particular embodiment, however, a distal end 185 of the sleeve portion 182 is closed, blocking the open end of the cylinder 42. As such, the distal end 185 of the sleeve portion 182, which wraps around the second end 45 of the cylinder 42, acts to capture any inflation fluid that blows by the piston 46, and redirect the fluid into the expansion portion 184 of the cushion 180 via the blow by path around the piston 46 or a communication path (not shown) under a portion of clamp 88. The cushion 180 of FIG. 2 envelops substantially all of the cylinder 42.

Figure 3:
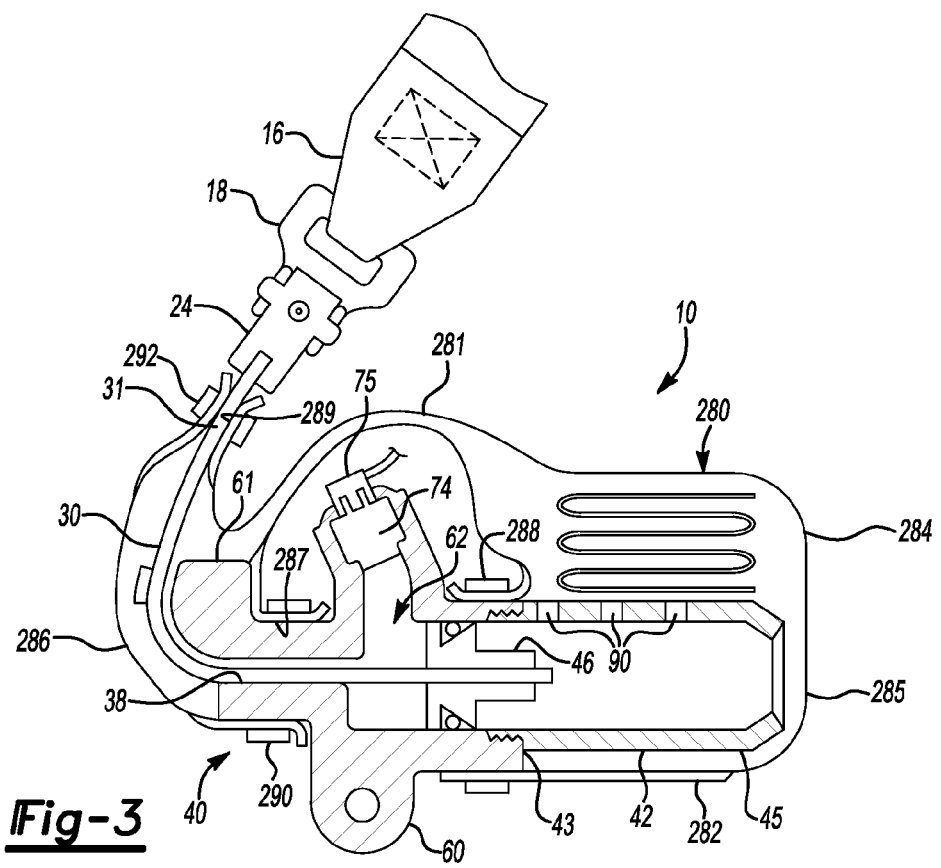
FIG. 3 is a side-view illustration of an inflatable airbag cushion configuration in accordance with another embodiment of the present invention.

FIG. 3 provides a side-view illustration, in partial cross-section, of an inflatable airbag cushion configuration, designated generally at 280, in accordance with another embodiment of the present invention. The cushion 280 is shown similarly situated and operable as described above with respect to the cushion 80 of FIGS. 1A-1B. However, the cushion 280 of FIG. 3 is divided into three primary portions: a sleeve portion 282, an expansion portion 284, and a bracket portion 286. Similar to the embodiment of FIG. 2, a distal end 285 of the sleeve portion 282 is closed, blocking the open end of the cylinder 42. As such, the distal end 285 of the sleeve portion 282, which wraps around the second end 45 of the cylinder 42, acts to capture any inflation fluid that blows by the piston 46, and redirect the fluid into the expansion portion 284 of the cushion 280.

The bracket portion 286 of the cushion 280 in FIG. 3 wraps around a rearward portion 61 of the bracket 60. The bracket portion 286 is also wrapped around at least a portion of the upper extent of the cable 30, extending all the way up to the lower anchor 24. First, second and third band clamps 288, 290 and 292, respectively, securely attach the inflatable cushion 280 to the pretensioner 40. Specifically, the first band clamp 288 secures the sleeve portion 282 to the cylinder 42, and also functions to fluidly seal the sleeve portion 282 about the outer perimeter of the cylinder 42 at the first end 43 thereof. The second band clamp 290 secures a first open end 287 of the bracket portion 286 around the rearward portion 61 of the bracket 60, fluidly sealing the same. The third band clamp 292 secures a second open end 289 of the cushion's bracket portion 286 around the first end 31 of cable 30, fluidly sealing the same. The bracket portion 286 of FIG. 3 acts to capture any inflation fluid that escapes from the gas chamber 62 through the guide channel 38, and redirect it to the expansion portion 280, via neck portion 281.

Figure 4:
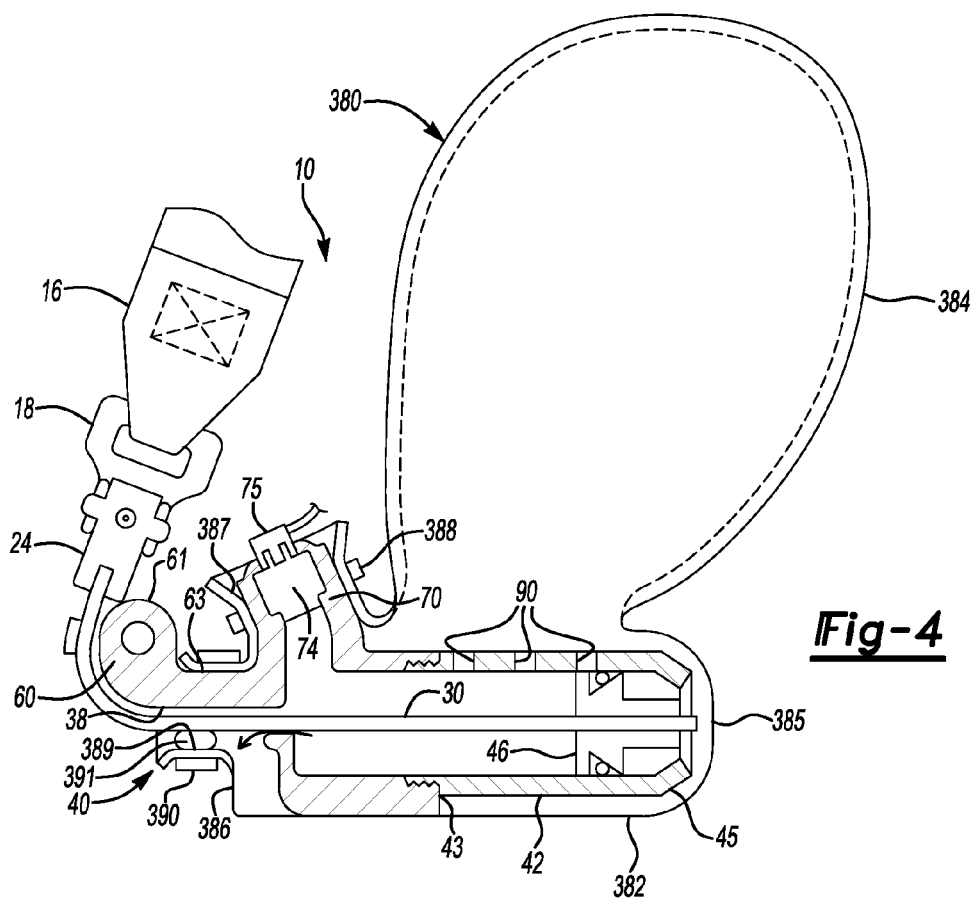
FIG. 4 is a side-view illustration of an inflatable airbag cushion configuration in accordance with yet another embodiment of the present invention.

FIG. 4 depicts an inflatable airbag cushion configuration, designated generally at 380, in accordance with another embodiment of the present invention. The cushion 380 of FIG. 4 is operable as described above with respect to the cushion 80 of FIGS. 1A-1B. Similar to the embodiment of FIG. 3, the cushion 380 of FIG. 4 is divided into three primary portions: a sleeve portion 382, an expansion portion 384, and a bracket portion 386. In addition, a distal end 385 of the sleeve portion 382 is closed, blocking the open end of the cylinder 42 in a manner similar to the embodiments of FIGS. 2 and 3.

First and second band clamps 388 and 390, respectively, securely attach the inflatable cushion 380 to the bracket 60. Specifically, the first band clamp 388 secures a first open end 387 of the bracket portion 386 around the boss portion 70 of the bracket 60. The second band clamp 390, on the other hand, secures a second open end 389 of the bracket portion 386 around the shank portion 63 of the bracket 60. The first and second band clamps 388, 390 also function to fluidly seal the cushion 380 about both the cylinder 42 and bracket 60. A seal, shown in cross-section with an oval shape at 391 in FIG. 4, may optionally be used to help seal the channel guide passage 38. The bracket portion 386 of FIG. 4 acts to capture any inflation fluid that escapes from the gas chamber 62, and redirect it to the expansion portion 280, while leaving the inflator 74 open for attachment to an electrical connector 75.

Figure 5:
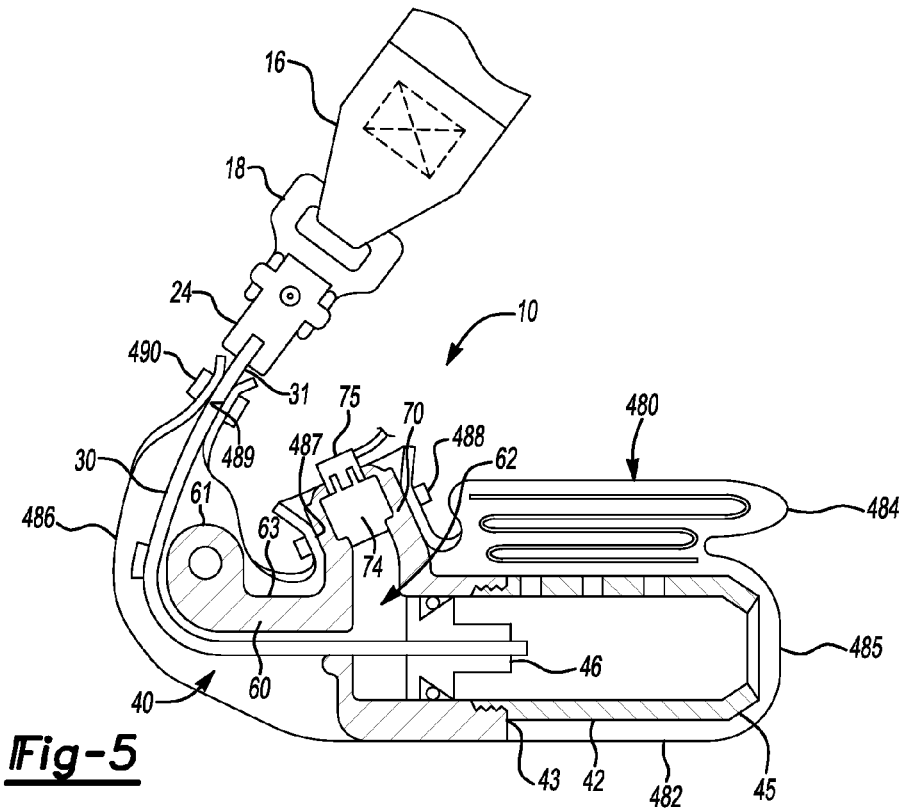
FIG. 5 is a side-view illustration of an inflatable airbag cushion configuration in accordance with even yet another embodiment of the present invention.

An inflatable cushion configuration in accordance with yet another embodiment of the present invention is shown in FIG. 5, and generally indicated by reference numeral 480. The cushion 480 of FIG. 5 is operable as described above with respect to the cushion 80 of FIGS. 1A-1B. Similar to the embodiment of FIGS. 3 and 4, the cushion 480 of FIG. 5 is divided into three primary portions: a sleeve portion 482, an expansion portion 484, and a bracket portion 486. In addition, a distal end 485 of the sleeve portion 482 is closed, blocking the open end of the cylinder 42 in a manner similar to the embodiments of FIGS. 2-4. Unlike the previous embodiments, however, the cushion 480 of FIG. 5 encloses the entire cylinder 42, as well as substantially all of the bracket 60 and cable 30. For example, first and second band clamps 488 and 490, respectively, securely attach the inflatable cushion 480 to the pretensioner 40 and cable 30. Specifically, the first band clamp 488 secures a first open end 487 of the cushion's bracket portion 486 around the boss portion 70 of the bracket 60. The second band clamp 490, on the other hand, secures a second open end 489 of the cushion's bracket portion 486 around the first upper end 31 of cable 30. The first and second band clamps 488, 490 also function to fluidly seal the cushion 480 about both the cylinder 42 and bracket 60. The bracket portion 486 of FIG. 5 acts to capture any inflation fluid that escapes from the gas chamber 62, and redirect it to the expansion portion 480, while leaving the inflator 74 open for attachment to the electrical connector 75.

It should also be noted that the inflator 74 may be placed longitudinally parallel to the tubular member 42, wherein the cushion's sleeve portion 482 would engulf or encase the inflator 74 therein. For instance, the safety restraint system 10 may be designed with the inflator 74 parallel to the tubular member 42, with the sleeve portion 482 of the cushion 480 encompassing the inflator 74. In this case, the wiring connection 75 for the inflator 74 would be packed inside the cushion 480, and the corresponding wiring may optionally pass through a) the clamped interface between cushion and the inflator 74, tubular member 42 or bracket 60 or b) a hole or slot in the cushion that has some form of fabric flap seal or other sealing means.

Referring to FIGS. 6A and 6B, a safety restraint system is shown in accordance with another embodiment of the present invention, and designated generally therein at 510. The safety restraint system 510 is substantially identical in operation and function to the embodiment shown in FIGS. 1A-1B. The primary distinction of the embodiment shown in FIGS. 6A and 6B is that a portion of the inflatable cushion 580 is operatively stowed inside the collapsible casing 532 when the cushion 580 is in the non-expanded state, as seen in FIG. 6A.

The cushion 580 is divided into three primary portions: a sleeve portion 582, which wraps around and encases the cylinder 42, an expansion portion 584, which is stowed inside the collapsible casing 532 for eventual deployment into the passenger compartment of the vehicle, and a bracket portion 586, which wraps around and encases a rearward portion 61 of the bracket 60 and the upper extent of cable 30. A neck portion 581 of the cushion 580 fluidly interconnects the three aforementioned portions—i.e., sleeve portion 582, expansion portion 584, and bracket portion 586. A distal end 585 of the sleeve portion 582 is closed, blocking the open end of the cylinder 42.

The inflatable cushion 580 is shown in a non-expanded, stowable state in FIG. 6A, wherein the expansion portion 584 of the cushion 580 is inside the collapsible casing 532 in a deflated and folded condition. The expansion portion 584 of the cushion 580 may be optionally attached to the seatbelt webbing 16 via stitching or some other mechanical means. It could also be attached to the joint between the upper anchor 18 and the lower anchor 24 (not shown). In addition, the piston 46 is shown in FIG. 6A in an undeployed position, situated immediately adjacent to the gas chamber 62, at the first end 43 of the cylinder 42. Upon activation of the inflator 74 (e.g., via a triggering signal sent through electrical connector 75 to electrical terminal 94), inflation gas is discharged into the gas chamber 62. As pressure increases in the gas chamber 62, the piston 46 is urged or forced to the deployed position, shown in FIG. 6B, until the piston 46 bottoms out against the narrowed portion 47 at the second end 45 of the cylinder 42.

Contemporaneously therewith, inflation gas is forced through the vent holes 90 and escape path 92 into the expansion portion 584 of the cushion 580 via neck portion 581 and any gas transmission through the guide channel 38. As the cushion 580 inflates, it pushes against and opens a deployment door such (e.g., discrete door 15), creating an opening 13 in the trim panel 12. In a similar regard, the inflating expansion portion 584 of the cushion 580 will push through a sidewall 531 (FIG. 6A) of the collapsible casing 532, creating a second opening 533 (FIG. 6B). The cushion 80 transitions through the openings 13, 533 to an expanded state, best shown in FIG. 6B, in which the cushion 580 is substantially outside the cavity 14 and casing 532, positioned between a vehicle occupant and a portion of the vehicle interior structure. Ideally, the collapsible casing 532 includes a tear seam or a material overlap joint, collectively represented in FIG. 6B in phantom at 590, that is configured to open such that the expansion portion 584 can deploy through the collapsible casing 532 when transitioning from the non-expanded state (FIG. 6A) to the expanded state (FIG. 6B).

FIGS. 7-7B illustrate that the key features of the present invention can also be integrated into belt retractor pretensioner configuration. The safety restraint system 610 shown in FIG. 7 is substantially identical in operation and function to the embodiments shown in the previous drawings, as described above. The primary distinction of the embodiment shown in FIGS. 7, 7A and 7B is that the pretensioner device 640 retracts a predetermined length of the belt webbing 16 through a belt retractor interface. In other words, the linking member that operatively connects the pretensioner piston 664 to the belt webbing 16 of the seatbelt assembly includes the belt retractor 630. Notably, the belt retractor 630 may be an emergency locking seatbelt retractor (ELR) or an automotive locking seatbelt retractor (ALR). The pretensioner 640 is shown in an exemplary embodiment in FIG. 7 as a "pushing chain" type pretensioner. However, the pretensioner 640 may take on any known retractor configuration, such as "pushing rack-and-pinion", "pushing ball-and-paddle", and "pulling cable" type pretensioners, without departing from the intended scope and spirit of the present invention.

In accordance with the embodiment of FIG. 7, the pretensioner 640 includes a tubular member 642 (also referred to herein as "cylinder") that defines an elongate channel 644 therein that is coaxially oriented with the cylinder 642, and curved at a second end 645 thereof. A piston 646 is slidably disposed inside the channel 644, operating, as described hereinabove, to transition from an undeployed position (shown in FIG. 7) to a deployed position (not shown). The piston 646 is attached to or pressed against a chain link 648 that is operatively engaged with a sprocket 650. The sprocket 650, in turn, is rigidly attached to a webbing spool (not shown) inside of the retractor for common rotation therewith. The safety restraint system 610 also includes an inflatable cushion or flexible membrane 680, which is shown in a non-expanded, stowable state in FIG. 7A, wherein the inflatable cushion 680 is inside an internal compartment 614 in a deflated and folded condition.

An inflator 674 is attached to the first end 643 of the cylinder 642. The inflator 74 is selectively actuable to dispense a fluid, preferably in the nature of a pressurized gas such as nitrogen, argon, or carbon dioxide. In doing so, the inflator 74 is operable to selectively simultaneously deploy the piston 46 from the undeployed position (shown in FIG. 1A) to the deployed position (shown in FIG. 1B), and to transition the inflatable cushion 80 from a non-expanded state (as seen in FIG. 1A) to an expanded state (as seen in FIG. 1B).

Upon activation of the inflator 674 (e.g., via a triggering signal sent through electrical connector 675), inflation gas is discharged into a gas chamber 662. As pressure increases in the gas chamber 662, the piston 646 is urged or forced to the deployed position (e.g., in a downward direction relative to FIG. 7). Translation of the piston 646 as described above will rotate the sprocket 650 and, in so doing, retract a predetermined length of the belt webbing 16, which increases the tension of the belt webbing 16.

Contemporaneous with the deployment of piston 646, inflation gas is forced into the cushion 680 through vent holes, shown hidden in FIG. 7 at 690, that are extend through the cylinder 642, thereby inflating the cushion 680. As the cushion 680 inflates, it pushes against and opens a portion of the trim panel 612, creating an opening 613 between the vehicle's side-trim panel 612 and the interior side-support structure 617, door seal 619, and door assembly 621. The cushion 680 transitions through the opening 613 to a second, expanded state (FIG. 7B), in which the cushion 680 is substantially outside the cavity 614, positioned between a vehicle occupant and a portion of the vehicle interior structure—e.g., support structure 617 and/or door assembly 621. As seen in FIG. 7B, a portion of the cushion 680 deploys on the inside of the side-trim panel 612 when transitioning from the non-expanded state (FIG. 7A) to the expanded state (FIG. 7B), thereby pushing a portion of the trim panel 612 inboard toward an occupant.

Also note that a gas escape path (like gas escape path 92 of FIG. 1A) can be optionally added by orienting the undeployed piston portion so that it is below the upper gas vent hole (690) to the cushion 680. Finally, unlike the embodiments shown in FIGS. 7A-7B with the safety restraint system 610 shown in the vehicle body structure, the safety restraint system 610 can also be located in the vehicle seat with the cushion 680 deploying through seat trim via tear seams, tear tabs, or "burping" trim parts. Air bag kinematics prior to deployment through the trim can also be controlled by various deployment chutes currently utilized for seat mounted side impact air bags.

While the best modes for carrying out the present invention have been described in detail herein, those familiar with the art to which this invention pertains will recognize various alternative designs and embodiments for practicing the invention within the scope of the appended claims. For instance, the pretensioner can be constructed using the various means within the industry for forming its structural housing, attaching the inflator, minimizing gas leakage around the cable, attaching the seatbelt webbing to the cable, minimizing gas leakage through the guide channel, forming a pretensioner travel stop, and forming a pretensioner reverse travel feature. The inflator could also be passed through a passage in the seat frame, the moving seat adjusting components, or any adjacent component to improve packaging.

In addition, the cushion could have numerous outer panel shapes, vent configurations, reinforcement panels, shaping tethers, and internal chambers to help control its deployment trajectory and restraint capacity. The cushion or whole restraint system could also be contained in a wrap, likely made from fabric or a boxlike structure, likely made of plastic to retain it prior to deployment. These containers could be integral or separate from the restraint system or the surrounding interfacing components such as the trim containing the deployment door system.

The invention claimed is:

1. A safety restraint system for a motorized vehicle having a passenger compartment with a safety belt assembly mounted therein, the safety belt assembly having a belt webbing, the safety restraint system comprising:
   a tubular member defining an elongate channel;
   a piston member operatively disposed inside said channel to selectively translate from an undeployed position to a deployed position;
   a linking member operatively connecting the belt webbing to said piston member such that translation of said piston member increases tension of the belt webbing;
   a cushion member operable to selectively transition from a non-expanded state to an expanded state, wherein at least a portion of said cushion member is wrapped around said tubular member; and
   an inflation device in fluid communication with both said cushion member and said tubular member, wherein activation of said inflation device operates to transition said cushion member from said non-expanded state, in which said cushion is generally stowed, to said expanded state, in which said cushion is deployed into the vehicle passenger compartment, and translate said piston member from said undeployed position to said deployed position.

2. The safety restraint system of claim 1, wherein said cushion member envelops substantially all of said tubular member.

3. The safety restraint system of claim 1, wherein said tubular member defines at least one vent hole therethrough, said at least one vent hole fluidly communicating said tubular member with said cushion member.

4. The safety restraint system of claim 3, wherein said at least one vent hole is configured to fluidly communicate said inflation device with said cushion member only after said piston member translates a predetermined distance from said undeployed position.

5. The safety restraint system of claim 1, wherein said linking member is a cable rigidly attached at a first end thereof to the belt webbing and at an opposing second end to said piston member.

6. The safety restraint system of claim 5, further comprising:
   a bracket member attached to said tubular member proximate to said first end of said channel, said bracket member adapted to guide said cable during translation of said piston member from said undeployed position to said deployed position.

7. The safety restraint system of claim 6, wherein said cushion member is further wrapped around at least a portion of said bracket member.

8. The safety restraint system of claim 7, wherein said cushion member is further wrapped around at least a portion of an upper extent of said cable.

9. The safety restraint system of claim 6, wherein said bracket member defines at least one gas escape path, said at least one gas escape path fluidly communicating said inflation device with said cushion member.

10. The safety restraint system of claim 9, wherein said at least one gas escape path is configured to direct fluid from said inflation device to said cushion member before said piston member translates away from said undeployed position.

11. The safety restraint system of claim 1, further comprising:
    a closeout cover housing both said tubular member and said cushion member.

12. The safety restraint system of claim 11, further comprising:
    a collapsible casing operatively attached at a first end thereof to said closeout cover and configured to enclose an upper extent of said linking member therein.

13. The safety restraint system of claim 12, wherein at least a portion of said cushion member is stowed inside said collapsible casing when said cushion member is in said non-expanded state.

14. The safety restraint system of claim 13, wherein said collapsible casing includes one of a tear seam and a material overlap joint configured to open such that said cushion member deploys through said collapsible casing when transitioning from said non-expanded state to said expanded state.

15. The safety restraint system of claim 13, wherein a portion of said cushion member is positively attached to the belt webbing.

16. The safety restraint system of claim 1, wherein said linking member includes a belt retractor member.

17. The safety restraint system of claim 16, wherein said belt retractor member, tubular member, and cushion member are housed inside a side-trim panel, said cushion member deploying through said side-trim panel when transitioning from said non-expanded state to said expanded state.

18. The safety restraint system of claim 17, wherein a portion of said cushion member deploys within said side-trim panel when transitioning from said non-expanded state to said expanded state thereby pushing a portion of said trim panel inboard.

19. A safety restraint system for selectively restraining an occupant of a motorized vehicle having a passenger compartment with a safety belt assembly mounted therein, the safety belt assembly having a belt webbing operatively mounted proximate to a seat assembly, the safety restraint system comprising:
    an inflator operable to release inflation fluid;
    a cylinder defining a channel elongated axially therein and in fluid communication with said inflator, said channel having first and second opposing ends, said cylinder further defining at least one vent hole therethrough;

a piston disposed inside said cylinder, and operable to selectively axially translate between said first and second ends of said channel from an undeployed position to a deployed position;

a linking member operatively connecting the belt webbing to said piston such that translation of said piston retracts a predetermined length of the belt webbing to thereby increase tension of the belt webbing;

an inflatable cushion with at least a portion thereof wrapped around said cylinder such that said at least one vent hole fluidly communicates said inflatable cushion with said cylinder, said inflatable cushion being operable to selectively transition from a non-expanded state, in which said cushion is generally stowed, to an expanded state, in which said cushion is deployed into the vehicle passenger compartment; and wherein activation of said inflator operates to transition said inflatable cushion from said non-expanded state to said expanded state and translate said piston from said undeployed position to said deployed position.

* * * * *